United States Patent [19]

Sekiguchi

[11] Patent Number: 5,738,419
[45] Date of Patent: Apr. 14, 1998

[54] ANTI-LOCK FLUID PRESSURE CONTROL APPARATUS WITH FAIL-SAFE MECHANISM

[75] Inventor: Akihiko Sekiguchi, Saitama, Japan

[73] Assignee: Akebono Brake Industry Co., Ltd., Tokyo, Japan

[21] Appl. No.: 705,879

[22] Filed: Aug. 28, 1996

[30]  Foreign Application Priority Data

Aug. 28, 1995  [JP]  Japan ................................. 7-218724

[51] Int. Cl.$^6$ ................................ B60T 8/02; B60T 8/48; B60T 13/16
[52] U.S. Cl. ........................................ 303/115.4; 303/116.2
[58] Field of Search ........................... 303/115.4, 115.5, 303/116.1, 116.2

[56]  References Cited

U.S. PATENT DOCUMENTS

| | | | |
|---|---|---|---|
| 4,453,782 | 6/1984 | Arikawa et al. | 303/115.4 |
| 4,618,189 | 10/1986 | Nakanishi et al. | 303/115.4 |
| 4,941,712 | 7/1990 | Hirobe | 303/115.4 |
| 5,004,301 | 4/1991 | Yamada et al. | 303/115.4 |
| 5,288,142 | 2/1994 | Burgdorf | 303/116.2 |
| 5,290,098 | 3/1994 | Burgdorf et al. | 303/115.4 |
| 5,378,055 | 1/1995 | Maas et al. | 303/115.4 |

*Primary Examiner*—Robert J. Oberleitner
*Assistant Examiner*—Chris Schwartz
*Attorney, Agent, or Firm*—Morgan, Lewis and Bockius LLP

[57]  ABSTRACT

A fail-safe mechanism has a piston, a first valve and a second valve which are opened/closed by the movement of the piston, a fluid pressure chamber, and a spring. The piston normally opens both the first valve and the second valve to make a master cylinder and a wheel cylinder communicate with each other, and make the wheel cylinder and a fluid chamber of a first fluid pressure control mechanism communicate with each other. At the time of anti-lock control, as the fluid pressure in the actuating circuit increases, the first valve is closed, and the brake fluid is fed back into the second fluid chamber of the first fluid pressure control mechanism only through the second valve. Further, when the fluid pressure in the actuating circuit decreases, the piston is moved to the fluid pressure chamber by the urging force of the spring to open the first valve and close the second valve so as to make the master cylinder and the wheel cylinder directly communicate with each other only through the first valve.

8 Claims, 4 Drawing Sheets

(NORMAL BRAKE OPERATION)

FIG. 2 (AT THE TIME OF ANTI-LOCK CONTROL)
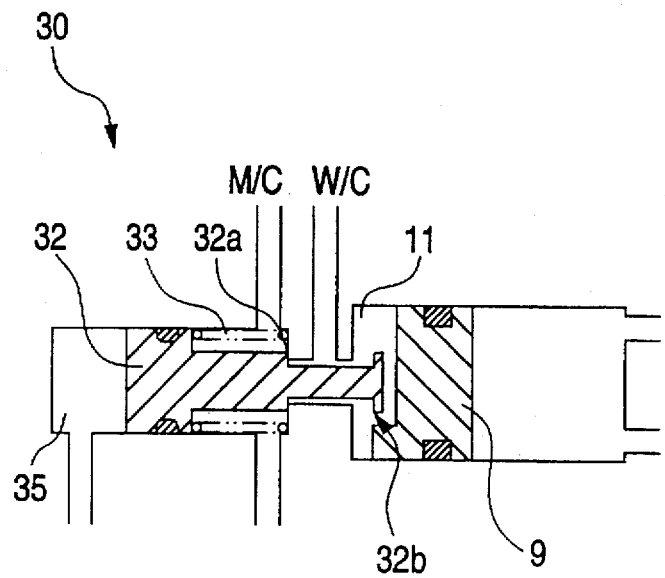
FIG. 3 (AT THE TIME OF FAILURE IN THE BRAKE CIRCUIT)
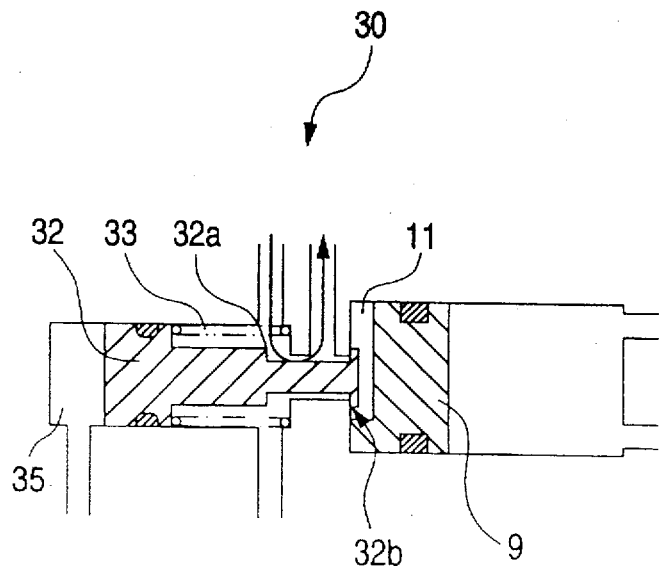

(NORMAL BRAKE OPERATION)

FIG. 5 (AT THE TIME OF ANTI-LOCK CONTROL)
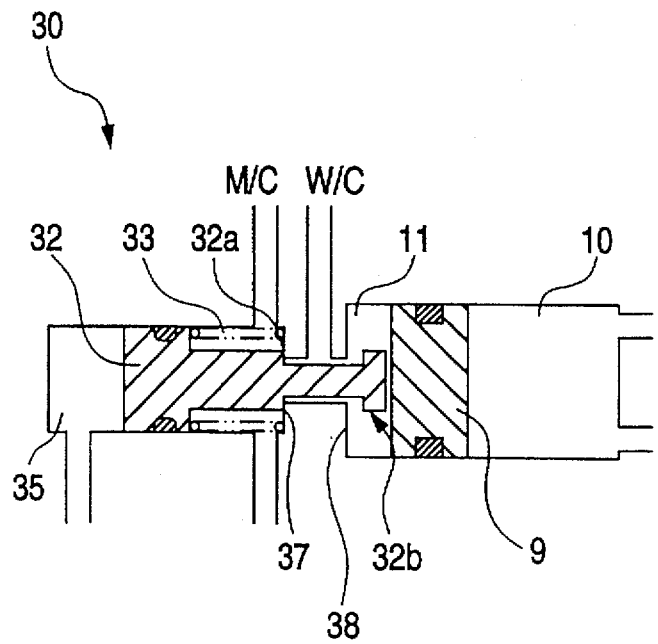
FIG. 6 (AT THE TIME OF FAILURE IN THE BRAKE CIRCUIT)
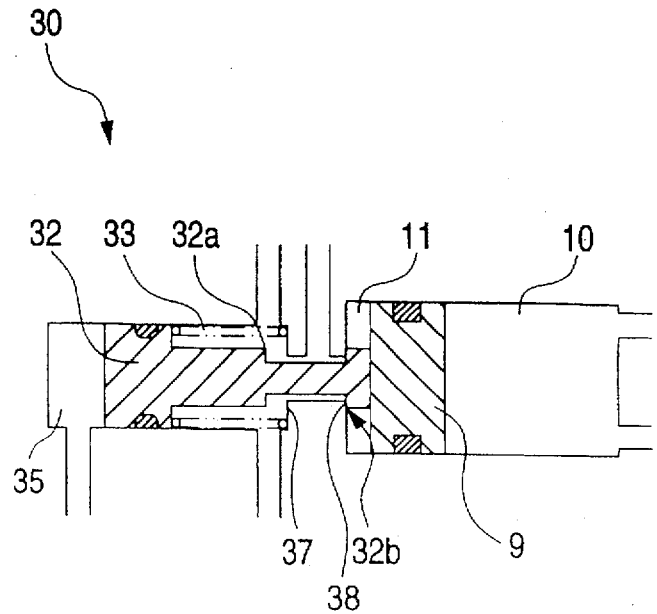

ANTI-LOCK FLUID PRESSURE CONTROL APPARATUS WITH FAIL-SAFE MECHANISM

BACKGROUND OF THE INVENTION

1. Field of the Invention

The present invention relates to an anti-lock fluid pressure control apparatus, and particularly to a variable-volume type anti-lock fluid pressure control apparatus having a fail-safe mechanism, which is small in size, light in weight and high in safety, and in which not only it is not necessary to provide a high-pressure accumulator, a pressure switch, a large reservoir tank, etc., but also it is possible to ensure a normal brake operation even in case of occurrence of a failure in a brake line.

2. Description of the Prior Art

A variable-volume type anti-lock fluid pressure control apparatus is known as a kind of anti-lock fluid pressure control apparatus. For example, Japanese Utility Model Publication No. Hei. 5-467 discloses such an apparatus in which a cut valve for breaking a main fluid path which connects a master cylinder to a wheel cylinder is provided on the way of the main fluid path, and a fluid pressure control piston is provided slidably in a fluid pressure control housing provided on the wheel cylinder side beyond the cut valve, so that the fluid pressure control housing is divided into a first fluid pressure chamber communicating with the wheel cylinder and the cut valve and a second fluid pressure chamber insulated from the first fluid pressure chamber by this fluid pressure control piston. The fluid pressure in the second fluid pressure chamber is increased/decreased by the control of an electromagnetic fluid pressure control valve so as to move the fluid pressure control piston forward and backward to thereby control the fluid pressure in the wheel cylinder so that the slip ratio of wheels is within a proper region.

However, in such a variable-volume type anti-lock fluid pressure control apparatus as mentioned above, it is necessary to provide a high-pressure accumulator or a pressure switch for monitoring the pressure thereof, and it is further necessary to provide a large-size reservoir tank for reserving brake fluid in a fluid pressure circuit for anti-lock control, so that the apparatus is enlarged in size and increased in weight as a whole. In addition, two control electromagnetic valves, that is, a hold valve and a decay valve, are required per a system, and the accumulator and the pressure switch to be used are expensive. Accordingly, the cost of the apparatus becomes high. Further, there has been such a problem that fail-safe measures are not satisfactory in case of occurrence of a failure in the pipe arrangement circuit.

SUMMARY OF THE INVENTION

It is therefore an object of the present invention to solve the foregoing problems, that is, to provide an anti-lock fluid pressure control apparatus which is high in safety and low in cost, and in which it is not necessary to provide a high-pressure accumulator, a pressure switch, a large-size reservoir tank, etc., it is also possible to reduce the number of electromagnetic valves for control into one per a system, and it is further possible to ensure a normal brake operation even in case of occurrence of a failure. By adopting an anti-lock fluid pressure control apparatus according to the present invention, the weight of a vehicle can be reduced and a brake operation can be surely performed even in case of occurrence of a failure.

According to a first aspect of the invention, there is provided an anti-lock fluid pressure control apparatus provided in a brake line connecting a master cylinder and a wheel cylinder, comprising: a first fluid pressure control mechanism having a first cylinder and a first piston, the first piston dividing the first cylinder to form a first fluid chamber and a second fluid chamber; a second fluid pressure control mechanism having a second cylinder and a second piston, the second piston dividing the second cylinder to form a fluid chamber and a spring storage chamber; and a fail-safe mechanism which increase and decrease the volume of the fluid chamber in the first fluid pressure control mechanism to control the brake fluid pressure; wherein the fail-safe mechanism comprises: a housing; a piston provided movably in the housing; a first valve and a second valve opened and closed by the movement of the piston; a fluid pressure chamber formed in the housing in such a manner that the housing is divided by the piston; and a spring for urging the piston to the fluid pressure chamber; wherein the fail-safe mechanism acts as follows: (i) normal brake time: the piston is made to open both the first and second valves by urging force of the spring and fluid pressure in the fluid pressure chamber to make the master cylinder communication with the wheel cylinder and make the wheel cylinder communication the fluid chamber of the first fluid pressure control mechanism; (ii) at the time of anti-lock control: the piston closes the first valve as the brake fluid pressure increases to block the communication between the master cylinder and wheel cylinder to thereby feed brake fluid from the wheel cylinder back into the second fluid chamber in the first fluid pressure control mechanism only through the second valve so as to control the brake fluid pressure; and (iii) at the time of decrease of the brake fluid pressure; the piston in the fail-safe mechanism is moved to the fluid pressure chamber by the urging force of the spring to open the first valve and close the second valve to block the communication between the wheel cylinder and second fluid chamber of the first fluid pressure control mechanism while make the master cylinder communicate with the wheel cylinder directly only through the first valve.

According to a second aspect of the invention, there is provided an anti-lock fluid pressure control apparatus provided in a brake line connecting a master cylinder and a wheel cylinder, comprising: a first fluid pressure control mechanism having a first cylinder and a first piston, the first piston dividing the first cylinder to form a first fluid chamber and a second fluid chamber; a second fluid pressure control mechanism having a second cylinder and a second piston, the second piston dividing the second cylinder to form a fluid chamber and a spring storage chamber; and a fail-safe mechanism which increase and decrease the volume of the fluid chamber in the first fluid pressure control mechanism to control the brake fluid pressure; wherein the fail-safe mechanism comprises: a housing; a piston provided movably in the housing; a first valve and a second valve opened and closed by the movement of the piston; a fluid pressure chamber formed in the housing in such a manner that the housing is divided by the piston; and a spring for urging the piston to the fluid pressure chamber; wherein the fail-safe mechanism acts as follows: (i) normal brake time: the piston is made to open the first valve and close the second valve by the balance among the urging force of the spring, the brake fluid pressure in the fluid pressure chamber, and the brake fluid pressure in the first fluid pressure chamber contacting with the second valve and acting on the first piston of the first fluid pressure control mechanism to thereby make the master cylinder and wheel cylinder communicate with each other and, at the same time, block the communication between the wheel cylinder and second fluid chamber in the first fluid pressure control mechanism; (ii) at the time of anti-lock control: the piston closes the first valve as the brake fluid pressure increases to block the communication between the master cylinder and wheel cylinder, and at the same time, opens the second valve to thereby feed brake fluid from the wheel cylinder back into the second fluid chamber in the first fluid pressure control mechanism so as to control the brake fluid pressure; and (iii) at the time of decrease of the brake fluid pressure; the piston in the fail-safe mechanism is pushed toward the fluid pressure chamber by the urging force of the spring to open the first valve and close the second valve to block the communication between the wheel cylinder and second fluid chamber of the first fluid pressure control mechanism while make the master cylinder communicate with the wheel cylinder directly only through the first valve.

BRIEF DESCRIPTION OF THE DRAWINGS

In the accompanying drawings:

FIG. 2 is a sectional view of the fail-safe mechanism of FIG. 1 in the state of anti-lock control;

FIG. 3 is a sectional view of the fail-safe mechanism of FIG. 1 in case of occurrence of a failure in an actuating circuit;

FIG. 5 is a sectional view of the fail-safe mechanism of FIG. 4 in the state of anti-lock control; and FIG. 6 is a sectional view of the fail-safe mechanism of FIG. 4 in case of occurrence of a failure in an actuating circuit.

DETAILED DESCRIPTION OF THE PREFERRED EMBODIMENTS

A first embodiment of the present invention will be described below with reference to the drawings.

Figure 1:
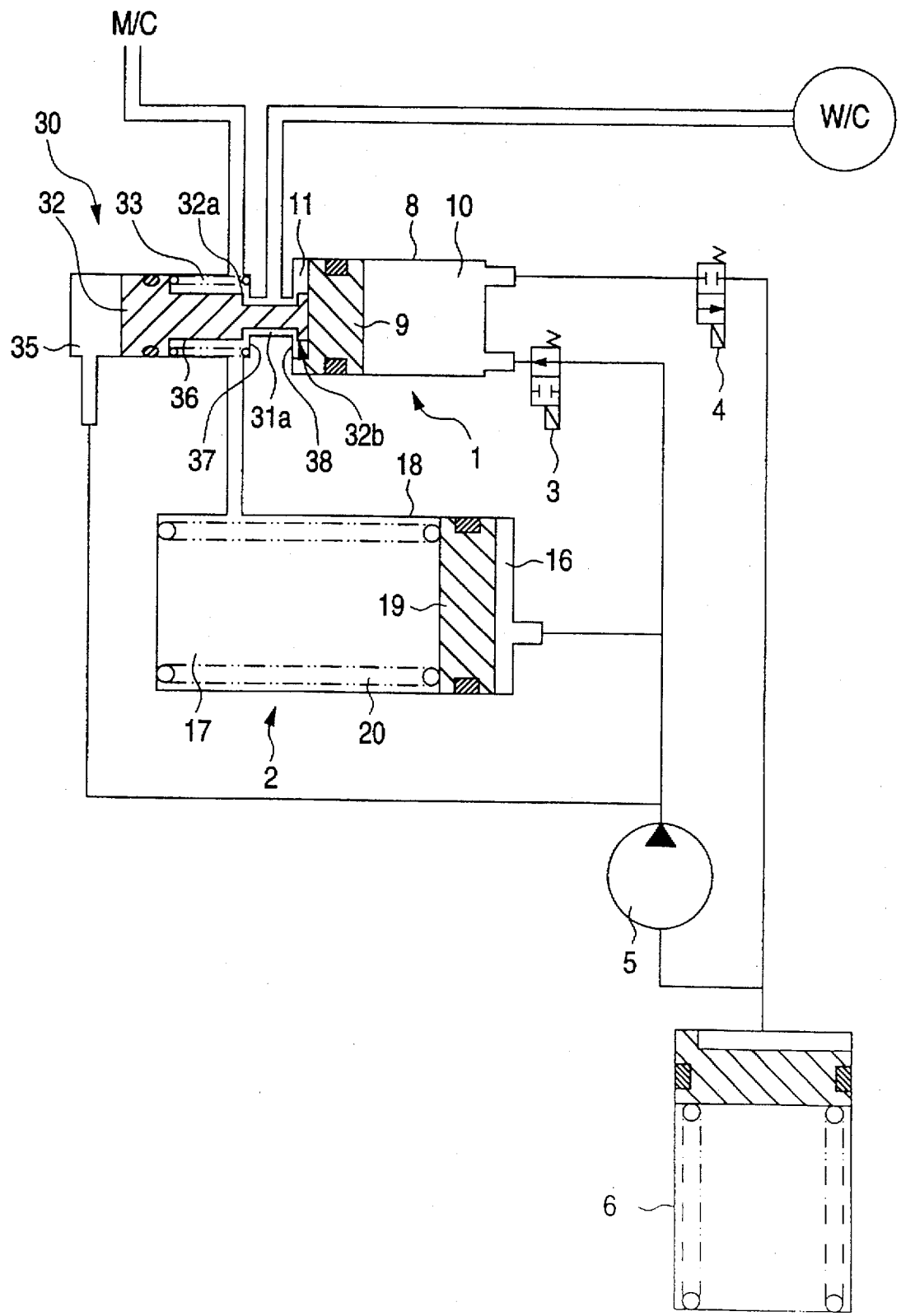
FIG. 1 is a structure diagram of an anti-lock fluid pressure control apparatus according to a first embodiment of the present invention.

FIG. 1 is a view showing the configuration of an anti-lock fluid pressure control apparatus provide with a fail-safe mechanism according to a first embodiment of the present invention. This drawing shows a configuration in which an actuating circuit for executing anti-lock control is included in a brake line system which connects a master cylinder to a wheel cylinder, and pipe arrangement systems for other wheel cylinders have configuration similar to this. In addition, a speed sensor, electronic control devices for controlling valves, and so on are similar to those in a conventional configuration, so that they are omitted to be illustrated in the drawings.

In FIG. 1, the reference numeral 1 represents a first fluid pressure control mechanism (detailed structure will be described later); 2, a second fluid pressure control mechanism (detailed structure will be described later); 30, a fail-safe mechanism (detailed structure will be described later); 3, a hold valve; 4, a decay valve; 5, a fluid pressure pump; 6, a reservoir; and W/C, a wheel cylinder. The hold valve, the decay valve, the fluid pressure pump and the reservoir have well-known structure. An actuating circuit in a brake line system means a pipe arrangement system circuit for executing anti-lock control, which is constituted by the first fluid pressure control mechanism, the second fluid pressure control mechanism, the fluid pressure pump, and the reservoir.

The first fluid pressure control mechanism 1 has a piston 9 provided slidable in a cylinder 8 formed in a fluid pressure control housing, so that the cylinder 8 is divided into a first fluid chamber 10 and a second fluid chamber 11 by this piston 9. The first fluid chamber 10 is made to communicate with the hold valve 3 and the decay valve 4, and the hold valve 3 is made to communicate with an exhaust port of the fluid pressure pump 5 and a fluid chamber 16 of the second fluid pressure control mechanism 2 which will be described later. The decay valve 4 is made to communicate with a suction port of the fluid pressure pump 5 and the reservoir 6 as illustrated in the drawing.

The second fluid chamber 11 of the first fluid pressure control mechanism 1 normally communicates with a master cylinder and one of wheel cylinders W/C as illustrated in the drawing, through a channel in the fail-safe mechanism 30 which will be described later.

That is, the fail-safe mechanism 30 has a piston 32 movably penetrating a channel 31a formed in the housing and having a first valve 32a and a second valve 32b, and a spring 33. The piston 32 forms a fluid pressure chamber 35 in the housing. The spring 33 is disposed in a small-diameter portion formed in the outer circumference of the piston 32, and as illustrated in the drawing, this small-diameter portion always communicates with a master cylinder and a spring storage chamber in the second fluid pressure control mechanism 2 which will be described later. The fluid pressure chamber 35 also communicates with the fluid chamber 16 of the second fluid pressure control mechanism and the first fluid chamber 10 of the first fluid pressure control mechanism through the hold valve 3 as shown in FIG. 1, so that the fluid pressure of the first fluid chamber 10 and the fluid chamber 16 always acts on the fluid pressure chamber 35. The first valve of the piston 32 is normally opened as shown in FIG. 1 by the balance between the spring 33 and the fluid pressure in the fluid pressure chamber 35 so as to make the master cylinder and the wheel cylinder communicate with each other. In addition, the second valve of the piston 32 normally makes the wheel cylinder and the second fluid chamber 11 of the first fluid pressure control mechanism communicates with each other as illustrated in the drawing. In this state, the second valve 32b of the piston 32 contacts with the piston 9 in the first fluid pressure control mechanism.

The fluid pressure chamber 35 also communicates with the fluid chamber 16 of the second fluid pressure control mechanism and the first fluid chamber 10 of the first fluid pressure control mechanism through the hold valve 3 as mentioned above, and the fluid pressure of the first fluid chamber 10 always acts on the fluid pressure chamber 35, so that the piston 32 maintains the state shown in FIG. 1 against the urging force of the spring 33 by the effect of that fluid pressure when there is no failure in the actuating circuit. As a result, the first valve 32a formed in the piston 32 is normally separated from a valve seat 37, and the second valve 32b is separated from a valve seat 38 so as to make the master cylinder communicate with the wheel cylinder and the second fluid chamber 11 of the first fluid pressure control mechanism 1.

The fail-safe mechanism 30 makes the master cylinder communicate with the second fluid chamber 11 and the wheel cylinder W/C when there is no failure (in the state shown in FIG. 1) as mentioned above, while in case of occurrence of a failure in the actuating circuit for some reasons so that the fluid pressure in the fluid pressure chamber 35 decreases, the piston moves to the left in FIG. 1 by the action of the spring 33 to close the second valve 32b so that the master cylinder communicates with the wheel cylinder through the first valve 32a which is open, so that a brake operation can be performed by the fluid pressure from the master cylinder.

The second fluid pressure control mechanism 2 has a piston 19 provided slidable in a cylinder 18 formed in the fluid pressure control housing, so that the cylinder 18 is divided into the fluid chamber 16 and the spring storage chamber 17 by this piston 19. While a spring 20 is disposed in the spring storage chamber 17, the spring storage chamber 17 communicates with the piston small-diameter portion of the fail-safe mechanism 30, and the fluid chamber 16 communicates with the hold valve 3 and the exhaust port of the fluid pressure pump 5 as mentioned above, and further with the fluid pressure chamber 35 of the fail-safe mechanism as illustrated in the drawing. In addition, the piston 19 of the second fluid pressure control mechanism 2 is normally urged right by the spring 20 in the spring storage chamber 17, as illustrated in the drawing.

The suction port of the fluid pressure pump 5 is connected to the decay valve 4 and the reservoir 6 as mentioned above, so that the pump 5 operates at the time of anti-lock control so as to pump brake fluid up from the reservoir 6 or the first fluid chamber 10 of the first fluid pressure control mechanism 1. The operation of the fluid pressure pump 5 at the time of anti-lock control and the open/close timing of the decay valve 4 are known, and they are not features of the present invention. Accordingly, detailed description thereof is omitted herein.

The operation of the anti-lock fluid pressure control apparatus having such a structure will be described.

[Normal Brake Time]

The first fluid chamber 10 of the first fluid pressure control mechanism is filled with brake fluid pressure having predetermined fluid pressure (depending on the spring 20 in the second fluid pressure control mechanism 2), and each of the first fluid pressure control mechanism 1, the second fluid pressure control mechanism 2 and the fail-safe mechanism 30 keeps the state of FIG. 1. As a result, the first valve 32a and the second valve 32b of the fail-safe mechanism 30 are opened, so that the second fluid chamber 11 of the first fluid pressure control mechanism 1 communicates not only with the spring storage chamber 17 of the second fluid pressure control mechanism but also with the master cylinder through the outer circumference of the small-diameter portion 36 of the piston 32 of the fail-safe mechanism 30, and further communicates with the wheel cylinder through the opened second valve 32b of the fail-safe mechanism 30.

That is, a pressurizing chamber of the master cylinder communicates with the piston small-diameter portion 36 of the fail-safe mechanism 30, the opened first valve 32a, the channel 31a and the wheel cylinder W/C sequentially. As a result, by stepping on a brake pedal, the brake fluid pressure generated in the pressurizing chamber of the master cylinder is supplied to the wheel cylinder through the above-mentioned channel to make the brake operate.

When the brake is to be released, the brake fluid in respective wheel cylinders is fed back to the master cylinder through the path reverse to the above-mentioned path so that the brake is released.

At this time, the first fluid chamber is filled with brake fluid of predetermined fluid pressure, so that satisfactory brake operation can be executed without moving.

[Anti-Lock Control Time]

Pressure reduction time: If wheels are, for example, brought into lock state during brake operation, a not-shown detection device detects the lock of the wheels, and an electronic control device closes the hold valve 3 in a brake line system, opens the decay valve 4, and operates the fluid pressure pump 5.

Then, the brake fluid in the first fluid chamber 10 divided by the piston 9 of the first fluid pressure control mechanism 1 flows out into the reservoir 6 through the opened decay valve 4, and the piston 9 of the first fluid pressure control mechanism 1 is moved to the first fluid chamber 10 by the fluid pressure from the wheel cylinder. With this movement, the piston 32 in the fail-safe mechanism 30 also moves to the right in the drawing by the fluid pressure in the fluid pressure chamber 35, and closes the first valve 32a as shown in FIG. 2. After that, the brake fluid pressure in the wheel cylinder flows into the second fluid chamber 11 of the first fluid pressure control mechanism 1 through the opened second valve 32b of the fail-safe mechanism 30, so that the piston 9 moves toward the first fluid chamber 10 to increase the volume of the second fluid chamber 11 and reduce the brake fluid pressure in the wheel cylinder.

The brake fluid in the reservoir 6 is pumped up by the fluid pressure pump 5 which operates at almost the same time as this, and flows into the fluid chamber 16 divided by the piston 19 of the second fluid pressure control mechanism 2. The piston 19 of the second fluid pressure control mechanism 2 is moved against the urging force of the spring 20 by the brake fluid flowing into the fluid chamber 16, so that the brake fluid in the spring storage chamber 17 is fed back to the pressurizing chamber of the master cylinder through the piston small-diameter portion 36 of the fail-safe mechanism 30. Reducing the pressure of the wheel cylinder at the time of anti-lock control is performed thus by increasing the volume of the second fluid chamber 11 as the piston 9 of the first fluid pressure control mechanism 1 moves. At this time, the fluid pressure of the fluid chamber 16 in the second fluid pressure control mechanism 2 acts on the fluid pressure chamber 35 in the fail-safe mechanism 30, so that the piston 32 in the fail-safe mechanism 30 keeps the state to close the first valve 32a as shown in FIG. 2.

Repressurizing time: In accordance with a command from a not-shown electronic control device, the hold valve 3 is opened and the decay valve 4 is closed at the time of repressurizing. Being kept to operate also in this state, the fluid pressure pump 5 is brought into an idling state so that the exhaust pressure decreases. As a result, the piston 19 of the second fluid pressure control mechanism moves toward the fluid chamber 16 by the urging force of the spring 20 of the second fluid pressure control mechanism 2, and the brake fluid which has flown into the fluid chamber 16 flows into the first fluid chamber 10 of the first fluid pressure control mechanism 1 through the hold valve 3 to thereby move the piston 9 of the first fluid pressure control mechanism 1 toward the second fluid chamber 11. As a result, the brake fluid in the second fluid chamber 11 is returned to the wheel cylinder through the opened second valve 32b of the fail-safe mechanism 30, so that repressurizing is executed.

[In case of Occurrence of a Failure in the Actuating Circuit]

In case a failure occurs in the actuating circuit, the brake fluid pressure in the circuit decreases so that the fluid pressure in the first fluid chamber 10 in the first fluid pressure control mechanism 1 also decreases. Further, the fluid pressure in the fluid pressure chamber 35 in the fail-safe mechanism 30 also decreases. As a result, the piston 32 in the fail-safe mechanism is moved to the position of FIG. 3 by the urging force of the spring 33, so that the first valve 32a is opened to make the master cylinder and the wheel cylinder directly communicate with each other, while the second valve 32b is closed to block the communication between the wheel cylinder and the second fluid chamber 11 in the first fluid pressure control mechanism 1.

Consequently, even in case of occurrence of a failure in the actuating circuit, the brake fluid pressure generated in the master cylinder is supplied, through the master cylinder, the opened first valve 32a of the fail-safe mechanism 30 and the channel 31a, to the wheel cylinder so that the brake can be applied.

As has been described above, the fail-safe mechanism 30 has a function to make the master cylinder and the wheel cylinder communicate directly with each other when the brake fluid pressure in the pipe arrangement decreases, so that the brake can be applied surely even in the case of occurrence of a failure. When a failure occurs in the actuating circuit, the second valve 32b in the fail-safe mechanism 30 is closed to prevent the brake fluid from flowing into the second fluid chamber 11 so that there is no such a phenomenon that the brake fluid is taken by the second fluid chamber 11 at the time of braking.

Figure 4:
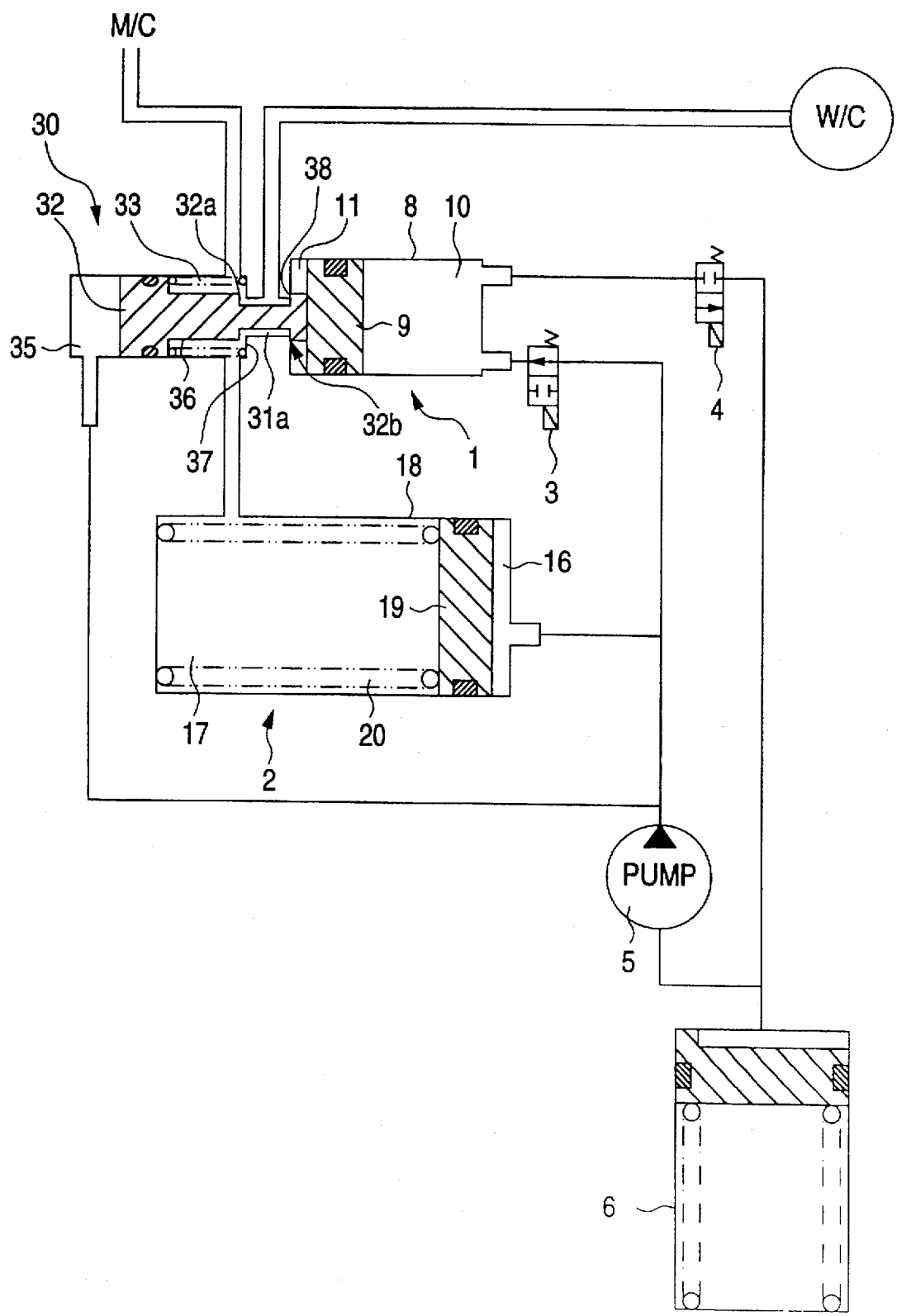
FIG. 4 is a view showing the configuration of an anti-lock fluid pressure control apparatus according to a second embodiment of the present invention.

Next, a second embodiment of the present invention will be described. FIG. 4 is a view showing the configuration of an anti-lock fluid pressure control apparatus provided with a fail-safe mechanism according to the second embodiment, FIG. 5 is a view showing an operation state of the fail-safe mechanism at the time of anti-lock control, and FIG. 6 is a view showing an operation state of the fail-safe mechanism when a failure occurs in an actuating circuit.

The second embodiment is different from the first one only in the configuration of the fail-safe mechanism. Accordingly, the configuration of the fail-safe mechanism will be mainly described below. The reference numerals used in the first embodiment are also in the second embodiment correspondingly.

The fail-safe mechanism in the second embodiment is different from that in the first embodiment in the point that the first valve 32a is normally opened and the second valve 32b is normally closed.

That is, the fail-safe mechanism 30 has a piston 32 movably penetrating a channel 31a formed in the housing and having a first valve 32a and a second valve 32b and a spring 33. The piston 32 forms a fluid pressure chamber 35 in the housing. The spring 33 is disposed in a small-diameter portion formed in the outer circumference of the piston 32, and as illustrated in the drawing, this small-diameter portion 36 always communicates with a master cylinder and a spring storage chamber 17 in a second fluid pressure control mechanism 2 which will be described later.

The fluid pressure chamber 35 communicates with a fluid chamber 16 of the second fluid pressure control mechanism and a first fluid chamber 10 of a first fluid pressure control mechanism through a hold valve 3 as shown in FIG. 4, so that the fluid pressure of the first fluid chamber 10 and the fluid chamber 16 always acts on the fluid pressure chamber 35. The fluid pressure acting on the fluid pressure chamber 35, the urging force of a spring 33, and further a force to push the second valve 32b to the left through a piston 9 in the first fluid pressure control mechanism act on the piston 32, so that the first valve 32a of the piston 32 is normally opened by the balance among these forces, and the second valve 32b is normally kept in a closed state (the state shown in FIG. 4).

In the normal state where no failure occurs in the actuating circuit, the piston 32 maintains the state shown in FIG. 4, so that the first valve 32a formed in the piston 32 is normally separated from a valve seat 37, and the second valve 32b contacts with a valve seat 38 so as to make the master cylinder communicate with the wheel cylinder and prevent the wheel cylinder from communicating with a second fluid chamber 11 of the first fluid pressure control mechanism 1. Therefore, a pressurizing chamber of the master cylinder communicates with the piston small-diameter portion 36 of the fail-safe mechanism 30, the opened first valve 32a, the channel 31a, and the wheel cylinder W/C sequentially. As a result, by stepping on a brake pedal, the brake fluid pressure generated in the pressurizing chamber of the master cylinder is supplied to the wheel cylinder through the above-mentioned channel to make the brake operate.

When the brake is to be released, the brake fluid in respective wheel cylinders is fed back to the master cylinder through the path reverse to the above-mentioned path so that the brake is released.

In the same manner as in the first embodiment at the time of anti-lock control, the fluid pressure in the first fluid chamber 10 of the first fluid pressure control mechanism is reduced so that the piston 9 moves to the right in the drawing to close the first valve 32a and open the second valve 32b, as shown in FIG. 5, to thereby introduce the brake fluid of the wheel cylinder into the second fluid chamber 11 in the first fluid pressure control mechanism to reduce the fluid pressure of the wheel cylinder.

In case where a failure occurs in the actuating circuit for some reasons so that the fluid pressure in the fluid pressure chamber 35 decreases, the state where the first valve 32a is opened and the second valve 32b is closed, can be maintained by the urging force of the spring 33 in the fail-safe mechanism 30, so that the master cylinder and the wheel cylinder are made to communicate directly with each other to allow the brake operation to be performed by the fluid pressure from the master cylinder.

As has been described above, in the fail-safe mechanism in the first embodiment, the master cylinder, the wheel cylinder and the second fluid chamber 11 in the first fluid pressure control mechanism are normally made to communicate through the first valve 32a and the second valve 32b both of which are opened, while in the fail-safe mechanism in the second embodiment, normally the first valve 32a is normally opened to make the master cylinder and the wheel cylinder communicate with each other and, at the same time, the second valve 32b is normally closed to prevent the wheel cylinder and the second fluid chamber in the first fluid pressure control mechanism from communicating with each other. Accordingly, even in case where a failure occurs as shown in FIG. 6 in the second embodiment, the second valve 32b is kept closed, so that the brake fluid from the master cylinder is prevented from flowing out into the second field chamber in the first fluid pressure control mechanism. Accordingly, there is no fear that the stroke of a brake pedal becomes large at the time of braking operation.

Although the first fluid chamber 10 of the first fluid pressure control mechanism is made to communicate with the fluid pressure pump through the hold valve 3 in the above-mentioned embodiments, an orifice or a flow control valve having a desired configuration may be used instead of this hold valve 3. Accordingly, repressurizing at the time of anti-lock control can be performed slowly so that control accuracy in repressurizing can be improved.

As has been described above in detail, in an anti-lock fluid pressure control apparatus according to the present invention, a master cylinder and a wheel cylinder can be made to communicate directly with each other by a fail-safe mechanism even in case where a failure occurs in an actuating circuit. Accordingly, it is possible to provide an anti-lock fluid pressure control apparatus which is high in safety. In addition, it is not necessary to provide any high-pressure accumulator in the anti-lock fluid pressure control apparatus, a pressure switch for monitoring the pressure thereof, and a reservoir for reserving brake fluid in the anti-lock control fluid pressure circuit, so that it is possible to make the apparatus small in size and light in weight as a whole. Further, since it is possible to eliminate an accumulator, a pressure switch, and an expensive hold valve, it is possible to reduce the cost of the apparatus as a whole. In addition, when an orifice or a flow control valve is used instead of the hold valve, repressurizing at the time of anti-lock control can be performed slowly, so that there are various superior effects. For example, the control of repressurizing can be executed accurately and speedily.

What is claimed is:

1. An anti-lock fluid pressure control apparatus provided in a brake line connecting a master cylinder and a wheel cylinder, comprising:

a first fluid pressure control mechanism having a first cylinder and a first piston, said first piston dividing said first cylinder to form a first fluid chamber and a second fluid chamber;

a second fluid pressure control mechanism having a second cylinder and a second piston, said second piston dividing said second cylinder to form a fluid chamber and a spring storage chamber; and a fail-safe mechanism which increases and decreases the volume of said fluid chambers in said first fluid pressure control mechanism to control the brake fluid pressure;

wherein said fail-safe mechanism comprises:

a housing;

a piston provided movably in said housing;

a first valve and a second valve opened and closed by the movement of said piston;

a fluid pressure chamber formed in said housing in such a manner that said housing is divided by said piston; and a spring for urging said piston to said fluid pressure chamber;

wherein said fail-safe mechanism acts as follows:

(i) normal brake operation: said piston of said fail-safe mechanism is made to open both said first and second valves by an urging force of said spring and fluid pressure in said fluid pressure chamber to make said master cylinder communicate with said wheel cylinder and make said wheel cylinder communicate with said second fluid chamber of said first fluid pressure control mechanism;

(ii) at the time of anti-lock control: said piston of said fail-safe mechanism closes said first valve as the brake fluid pressure increases to block the communication between said master cylinder and wheel cylinder to thereby feed brake fluid from said wheel cylinder back into said second fluid chamber in said first fluid pressure control mechanism only through said second valve so as to control the brake fluid pressure; and (iii) at the time of a decrease of the brake fluid pressure as a result of a failure said piston into said fail-safe mechanism is moved to said fluid pressure chamber by the urging force of said spring to open said first valve and close said second valve to block the communication between said wheel cylinder and second fluid chamber of said first fluid pressure control mechanism while making said master cylinder communicate with said wheel cylinder directly only through said first valve.

2. The anti-lock fluid pressure control apparatus according to claim 1, further comprising:

a reservoir;

a decay valve through which said first fluid chamber of said first fluid pressure control mechanism communicates with said reservoir;

a fluid pressure pump;

a hold valve through which said first fluid chamber of said first fluid pressure control mechanism communicates with said fluid pressure pump and said fluid chamber of said second fluid pressure control mechanism.

3. The anti-lock fluid pressure control apparatus according to claim 1, further comprising:

a reservoir;

a decay valve through which said fluid chamber of said first fluid pressure control mechanism communicate with said reservoir;

a fluid pressure pump;

an orifice through which said first fluid chamber of said first fluid pressure control mechanism communicates with said fluid pressure pump and said fluid chamber of said second fluid pressure control mechanism.

4. The anti-lock fluid pressure control apparatus according to claim 1, further comprising:

a reservoir;

a decay valve through which said first fluid chamber of said first fluid pressure control mechanism communicates with said reservoir;

a fluid pressure pump;

a flow control valve through which said first fluid chamber of said first fluid pressure control mechanism communicates with said fluid pressure pump and said fluid chamber of said second fluid pressure control mechanism.

5. An anti-lock fluid pressure control apparatus provided in a brake line connecting a master cylinder and a wheel cylinder, comprising:

a first fluid pressure control mechanism having a first cylinder and a first piston, said first piston dividing said first cylinder to form a first fluid chamber and a second fluid chamber;

a second fluid pressure control mechanism having a second cylinder and a second piston, said second piston dividing said second cylinder to form a fluid chamber and a spring storage chamber; and a fail-safe mechanism which increases and decreases the volume of said fluid chambers in said first fluid pressure control mechanism to control the brake fluid pressure;

wherein said fail-safe mechanism comprises:

a housing;

a piston provided movably in said housing;

a first valve and a second valve opened and closed by the movement of said piston;

a fluid pressure chamber formed in said housing in such a manner that said housing is divided by said piston; and a spring for urging said piston to said fluid pressure chamber;

wherein said fail-safe mechanism acts as follows:

(i) normal brake operation said piston of said fail-safe mechanism is made to open said first valve and close said second valve by the balance among the an urging force of said spring, the brake fluid pressure in said fluid pressure chamber, and the brake fluid pressure in said first fluid pressure chamber contacting with said second valve and acting on said first piston of said first fluid pressure control mechanism to thereby make said master cylinder and wheel cylinder communicate with each other and, at the same time, block the communication between said wheel cylinder and second fluid chamber in said first fluid pressure control mechanism;

(ii) at the time of anti-lock control, said piston of said fail-safe mechanism closes said first valve as the brake fluid pressure increases to block the communication between said master cylinder and wheel cylinder, and at the same time, opens said second valve to thereby feed brake fluid from said wheel cylinder back into said second fluid chamber in said first fluid pressure control mechanism so as to control the brake fluid pressure; and (iii) at the time of a decrease of the brake fluid pressure as a result of a failure; said piston in said fail-safe mechanism is pushed toward said fluid pressure chamber by the urging force of said spring to open said first valve and close said second valve to block the communication between said wheel cylinder and said second fluid chamber of said first fluid pressure control mechanism while making said master cylinder communicate with said wheel cylinder directly only through said first valve.

6. The anti-lock fluid pressure control apparatus according to claim 5, further comprising:

a reservoir;

a decay valve through which said first fluid chamber of said first fluid pressure control mechanism communicates with said reservoir;

a fluid pressure pump;

a hold valve through which said first fluid chamber of said first fluid pressure control mechanism communicates with said fluid pressure pump and said fluid chamber of said second fluid pressure control mechanism.

7. The anti-lock fluid pressure control apparatus according to claim 5, further comprising:

a reservoir;

a decay valve through which said first fluid chamber of said first fluid pressure control mechanism communicates with said reservoir;

a fluid pressure pump;

an orifice through which said first fluid chamber of said first fluid pressure control mechanism communicates with said fluid pressure pump and said fluid chamber of said second fluid pressure control mechanism.

8. The anti-lock fluid pressure control apparatus according to claim 5, further comprising:

a reservoir;

a decay valve through which said first fluid chamber of said first fluid pressure control mechanism communicates with said reservoir;

a fluid pressure pump;

a flow control valve through which said first fluid chamber of said first fluid pressure control mechanism communicates with said fluid pressure pump and said fluid chamber of said second fluid pressure control mechanism.

* * * * *

UNITED STATES PATENT AND TRADEMARK OFFICE
CERTIFICATE OF CORRECTION

PATENT NO. : 5,738,419
DATED : April 14, 1998
INVENTOR(S) : Akihiko SEKIGUCHI

It is certified that error appears in the above-indentified patent and that said Letters Patent is hereby corrected as shown below:

Column 10, line 16, change "communicate" to --communicates--.

Signed and Sealed this

Eleventh Day of May, 1999

*Attest:*

Q. TODD DICKINSON

*Attesting Officer*          Acting Commissioner of Patents and Trademarks